United States Patent
Gbadegesin

(10) Patent No.: US 7,293,095 B2
(45) Date of Patent: *Nov. 6, 2007

(54) METHOD OF SESSION PAYLOAD EDITING

(75) Inventor: Abolade Gbadegesin, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 10/843,523

(22) Filed: May 11, 2004

(65) Prior Publication Data

US 2004/0210674 A1 Oct. 21, 2004

Related U.S. Application Data

(63) Continuation of application No. 09/573,143, filed on Mar. 29, 2000, now Pat. No. 6,754,709.

(51) Int. Cl.
*G06F 15/16* (2006.01)
*G06F 13/00* (2006.01)

(52) U.S. Cl. ............... 709/227; 719/328; 709/245

(58) Field of Classification Search ............ 709/227, 709/245; 719/328
See application file for complete search history.

(56) References Cited

U.S. PATENT DOCUMENTS

| | | | |
|---|---|---|---|
| 6,006,258 A | 12/1999 | Kalajan | |
| 6,058,431 A | 5/2000 | Srisuresh et al. | |
| 6,128,664 A | 10/2000 | Yanagidate et al. | |
| 6,266,707 B1 | 7/2001 | Boden et al. | |
| 6,324,582 B1 | 11/2001 | Sridhar et al. | |
| 6,418,476 B1 | 7/2002 | Luciani | |
| 6,493,765 B1 | 12/2002 | Cunningham et al. | |
| 6,529,517 B2 | 3/2003 | Hrastar et al. | |
| 6,754,709 B1 * | 6/2004 | Gbadegesin | 709/227 |
| 7,149,222 B2 * | 12/2006 | Wiryaman et al. | 370/401 |

OTHER PUBLICATIONS

M. Chatel; Classical versus Transparent IP Proxies; Network Working Group; Mar. 1996; [web page]; http://www.ietf.org/rfc/rfc1919.txt.; [Accessed May 9, 2000].

(Continued)

*Primary Examiner*—Larry D. Donaghue
(74) *Attorney, Agent, or Firm*—Amin, Turocy & Calvin, LLP

(57) ABSTRACT

A method of payload editing in an intelligent transparent gateway is provided. Certain applications include addressing information within the data streams of their sessions. When running on clients that are sharing a connection, such applications would send private, unreachable addressing information to remote peers, and the latter would be unable to respond to the clients's requests. The system of the instant invention supports an extensible means of modifying a session's application-layer data in flight, beyond the modifications made to the session's network-layer and transport-layer addressing information. Extensibility is achieved by allowing drivers to inspect the application-layer data in each packet received for a session, and to edit the application data in each packet. These editors register themselves with the gNAT of the instant invention as handlers for a specific TCP/UDP port number, and are henceforth invoked for each message translated in matching sessions.

18 Claims, 6 Drawing Sheets

OTHER PUBLICATIONS

Nevod Adds Native Support For Multi-Player Games Including Diablo/Starcraft/Battle.net and Activision/Battlezone to its NAT1000 Internet Sharing Product Line; Nevod, Inc., Press Release, Dec. 14, 1998. http://www.nevod.com/products/nat1000_95.html.

F. Langa Ed.; High-Speed Surfing; Windows Magazine, n 1002, Feb. 1, 1999.

F. Langa Ed.; Easy, Low-Cost Web Access; Windows Magazine, n 1006A, Jun. 15, 1999.

Ositis Software Announces the Launch of WinProxy 3.0, The Complete Internet Sharing Solution; Ositis Software, Press Release, Aug. 10, 1999.

Windows 2000 Network Address Translator; Microsoft Corporation, Apr. 23, 1999.

Windows NT Network Address Translator; Microsoft Corporation, Oct. 3, 1998.

* cited by examiner

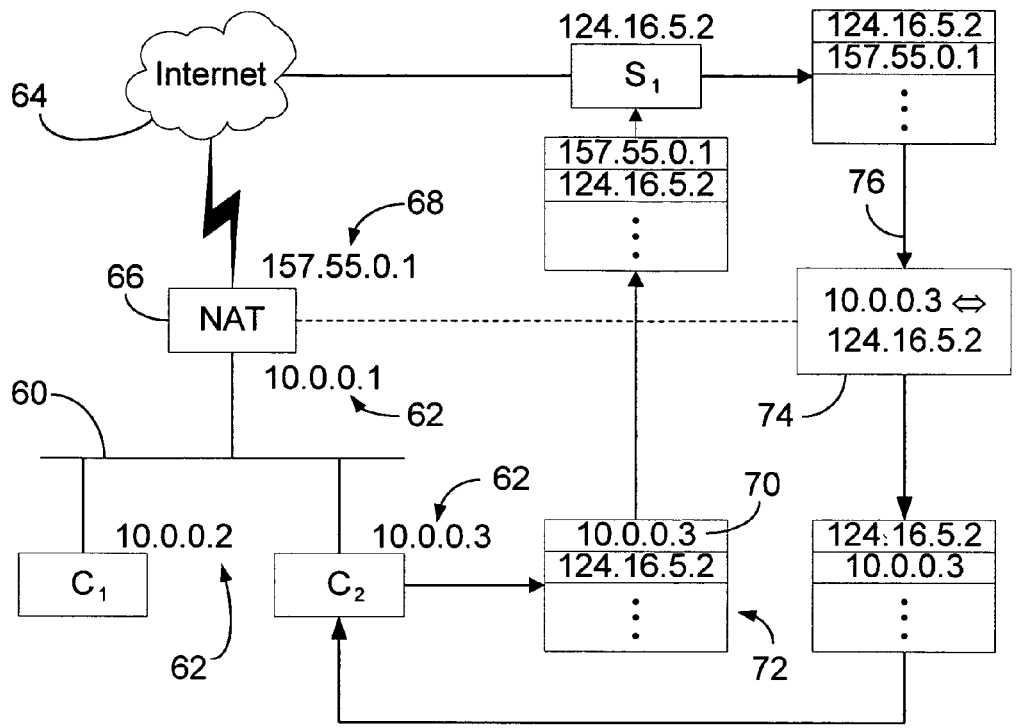
FIG. 2
(PRIOR ART)
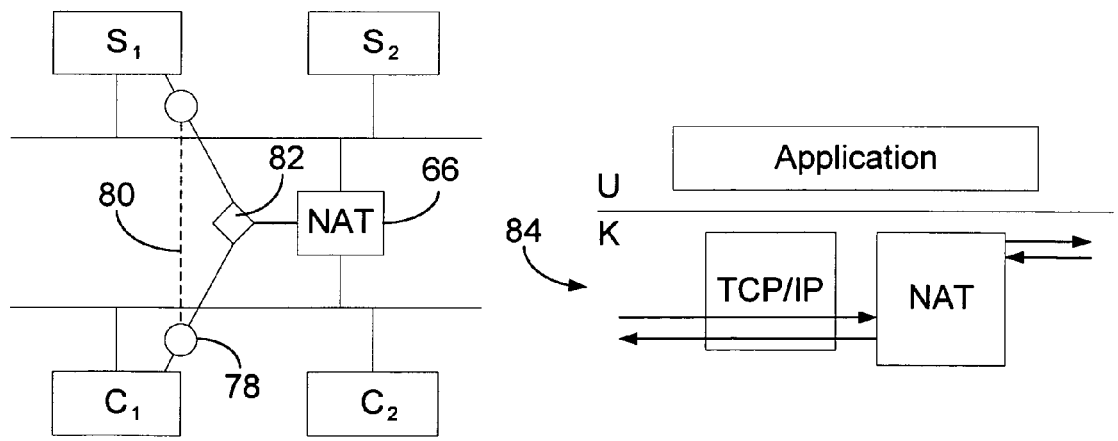
FIG. 3
(PRIOR ART)
FIG. 4
(PRIOR ART)

METHOD OF SESSION PAYLOAD EDITING

CROSS-REFERENCE TO RELATED PATENT APPLICATION

This patent application is a continuation of U.S. patent application Ser. No. 09/537,143, filed Mar. 29, 2000 now U.S. Pat. No. 6,754,709, entitled "Application Programming Interface and Generalized Network Address Translator for Intelligent Transparent Application Gateway Processes". The entire teachings and disclosure of this patent application are hereby incorporated in their entireties by reference thereto.

TECHNICAL FIELD

This invention relates generally to network address translation and proxy application control of network communication and, more particularly, relates to the combination of network address translation and proxy application functionality into a transparent application gateway process.

BACKGROUND OF THE INVENTION

As the number of computers that needed or wanted to be connected to the Internet continued to grow, it soon became obvious that this number could not be accommodated by the number of available IP addresses, known as dotted-quads. In response to this address depletion problem, a method as illustrated in FIG. 2 was devised whereby a number of computers C1, $C_2$, etc. could be located on a "private" network 60 and would use private IP addresses 62 to communicate with each other. These private IP addresses could be reused on other private networks since no one outside the private network could see these addresses. In order to allow the computers on the private network to communicate with other computes $S_1$, $S_2$, etc. on a public network, such as the Internet 64, the private network utilizes one machine 66 to provide the gateway for all of the computers on the private network to reach the public network. Through the use of the private addresses 62 on the private network 60 and the gateway computer 66, the address depletion problem is at least slowed.

This gateway computer 66 runs a program called a network address translator (NAT) that has both a private IP address 62 and a public IP address 68. As computers on the private network attempt to establish sessions with a server on a public network (or another private network), the NAT changes the source address 70 of the message packets 72 from the private address of the client computer to its public IP address. In this way, the private IP address is not communicated on the public network. The messages all appear to have come from the public IP address of the NAT machine. The NAT maintains a mapping 74 of the translation from the private to the public IP address so that when messages are received from the public network in response as illustrated by line 76, the NAT can forward them to the proper client machine. This operation of the NAT is completely transparent to the client computers on the private network, i.e. they each believe that they are communicating directly with the public servers.

FIG. 3 illustrates this redirect capability of the NAT machine. Specifically, a client machine $C_1$ attempts to establish a session 78 directly with public server $S_1$ as indicated by dashed line 80. However, when the message from $C_1$ is detected by the NAT 66, it dynamically redirects 82 the message to $S_1$ and changes the source address as described above. The client process does not know that the NAT has changed its messages' source address, and continues to believe that it is communicating directly with the public server. Messages from the server $S_1$ are dynamically redirected 82 to the client $C_1$ based on the mapping of the address translation. As may be seen from FIG. 4, this address translation takes place at a low level, e.g. at the kernel level 84 in a Window's architecture.

While the NAT has greatly alleviated the address depletion problem, especially for home and small business networks, its translation of source addresses is fixed within its programming. That is, the traditional NAT does not allow any application control of the address translations that it performs. Additionally, since the address translation is performed on the message packets at such a low level within the kernel 84, the NAT can add almost no value, other than providing the raw source address translation. The NAT cannot even provide any destination address translations, and does not fully support applications that either assume client and server addresses are both public and therefore equally accessible, or require that servers also initiate network sessions to clients. If added value is desired, such as centralized virus scanning, site blocking (parental-control filtering), white listing, caching (to speed up response-time), data-transformation (e.g. dithering of images to match screen size), etc., a proxy application must be used instead.

Traditional proxies, as illustrated in FIG. 5, are application programs existing in the user mode 86 that serve as the interface between the private 60 and the public 64 network (see FIG. 6). Unlike NATs, the proxy 88 must be addressed directly by the client machines as seen in the destination address field 90 of message packet 92, and therefore requires that the client applications $C_1$, $C_2$, etc. be setup to operate with a proxy 88. Many applications cannot do this, or require specific configuration changes to allow the use of a proxy, and therefore a proxy configuration may not be appropriate, or even possible, for use with all applications.

When a proxy application 98 is used, all communications are sent to the proxy in the user mode 86 (see FIG. 5) as illustrated by lines 94, 96. The proxy 98 then determines whether and to whom to forward the communication on the public network. If the proxy determines that the message may be passed to a server on the public network, the proxy establishes a second session 100, copies the data to the second session, changes the source and destination address, and sends out the message (see, also FIG. 7). In operational terms as illustrated in FIG. 7, a client process $C_1$ establishes a first session 94 with the proxy 88 requesting access to a public server $S_1$. If the proxy agrees, a second session 100 is established with the server $S_1$ on the public network 64. Since all messages must pass from the kernel-mode network transport, e.g. TCP/IP 102, to the user-mode proxy 98, be copied to a second session, transferred back down to the kernel-mode driver 102, and finally transmitted to the network for the network application's other session, a significant performance degradation occurs. However, proxy system promoters have begrudgingly accepted this performance degradation as the inevitable cost of the added value provided thereby.

Recognizing that the inability of various applications to utilize a proxy system precludes the adding of value to the network sessions using these applications, various software vendors have introduced transparent proxies. Transparent proxies operate like a traditional proxy in that they provide value to the network connection, and like a traditional NAT in that the network client need not specifically address them. The term transparent refers to the fact that the network client is unaware that its communication is being provided up to the proxy application. The client thinks that its communication is going directly to the network server, in much the same way as it does when a traditional NAT is used. However, the communication is actually redirected to the proxy application before being sent to the public network as illustrated FIG. 8.

As may be seen from this FIG. 8, as a client $C_1$ on private network 91 attempts to contact a server $S_1$ on a public network 64, the gateway machine 93 running the transparent proxy intercepts its messages. The transparent proxy operates by performing an address redirection through a traditional NAT 95 up to the proxy application 97. Once the proxy 97 has processed the message, it is passed back down to be sent to the server $S_1$. While this redirection is transparent to the client thereby allowing operation of the proxy with clients whose applications would not allow operation with a traditional proxy, this redirection is fixed within the NAT 95. This requires that all communication be transferred up to the proxy at the application level or user-mode, and back down to the transport level or kernel-mode prior to being transmitted to the server. Therefore, the performance degradation of the traditional proxy discussed above still plagues the transparent proxy system.

SUMMARY OF THE INVENTION

The instant invention overcomes these and other problems by providing an application programming interface for intelligent transparent application gateway processes. Specifically, the inventive concepts of the instant invention relate to an intelligent transparent proxy that utilizes an application programming interface for translation of transport-layer sessions and an application programming interface for port-reservation routines to provide proxy services without requiring that client applications be notified of the proxy at all. More particularly, the inventive concepts of the instant invention relate to a generalized network address translator and associated application programming interface (API) that allow both source and destination address translations to be made. The API allows control of the NAT by the proxy thereby providing the benefits of both a proxy server and a network address translator (NAT) while minimizing the transmission delays normally associated with traditional and transparent proxies.

With the intelligent transparent proxy of the instant invention, client applications do not know that they are communicating through a proxy, and therefore need not be configured to do so. This is accomplished by the instant invention by allowing the proxy to dynamically command a generalized NAT to effect both source and destination address translations to, essentially, reroute data flow up through the proxy without the client knowing. The address changes are mapped in the gNAT, and result in apparent sessions between different clients and servers. As the proxy identifies data transfers that need not be processed by the proxy, the proxy commands a dynamic address translation at the transport layer. This bypasses the necessity of transferring the data up to the proxy, thereby greatly increasing the performance of the system.

As an example of the operation of the intelligent transparent gateway of the instant invention, assume that a client application wanted to establish a session from itself to a server on a public network. The message would hit the translation mapping of the gNAT, and be converted to a message from client to the transparent gateway. The transparent gateway would pass the message up to the proxy for servicing. The proxy is able to then service the message itself, deny transmission of the message, pass the message on without modification, etc. If the message is forwarded to the server, it appears to have originated from the gateway. The translation mapping is recorded so that any return messages may be forwarded to the client application, if the proxy determines that it is appropriate to do so. This forwarding may require servicing by the proxy or may be passed without servicing, dependent only on the proxy commanded translation in the gNAT. This control provided to the proxy is unknown in prior systems.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 2 is a network block diagram illustrating architectural and communicative aspects of a traditional network address translator;

FIG. 3 is an operational block diagram of a traditional network address translator;

FIG. 4 is an architectural diagram illustrating a traditional network address translator;

DETAILED DESCRIPTION OF THE INVENTION

Figure 1:
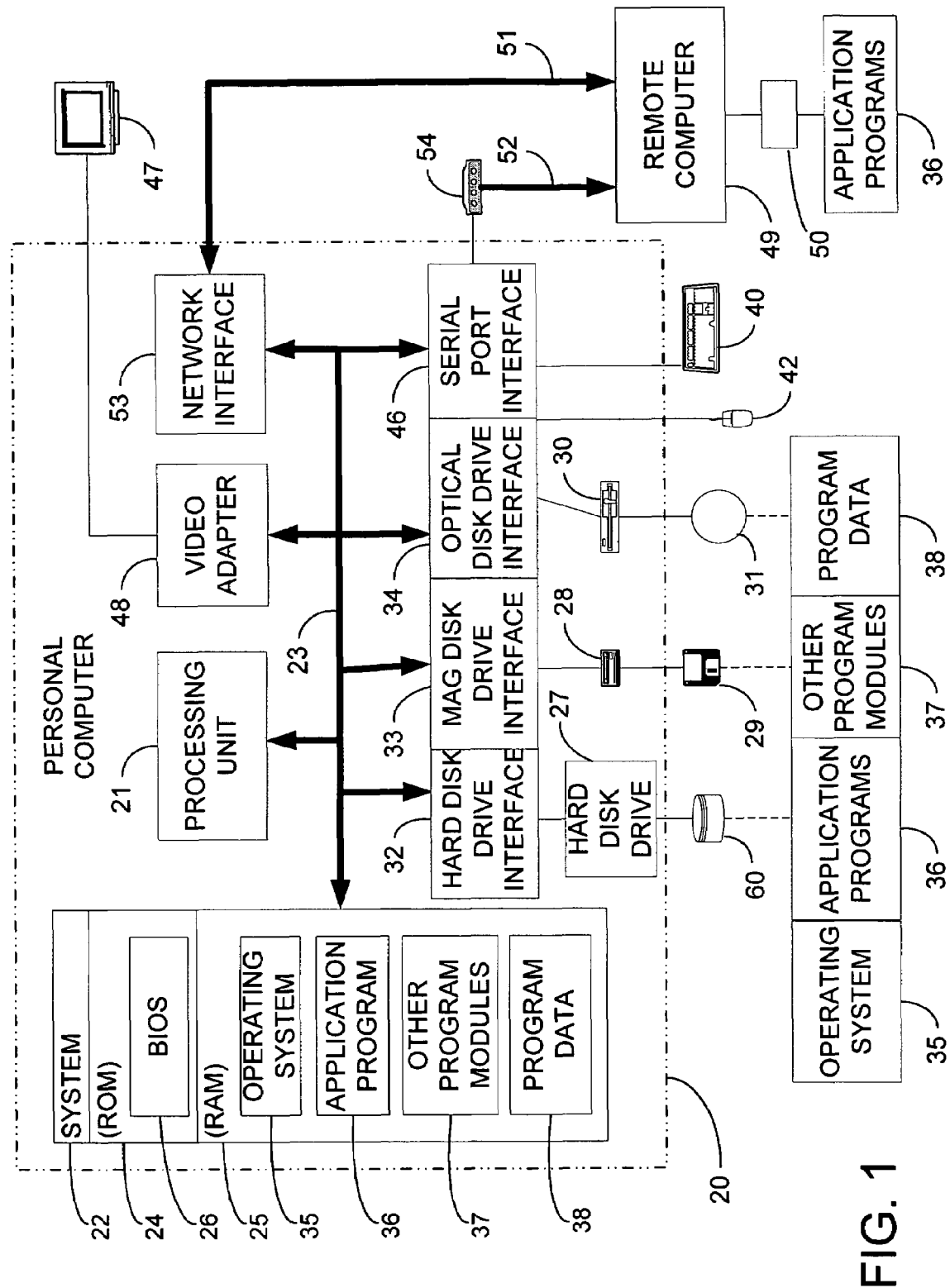
FIG. 1 is a block diagram generally illustrating an exemplary computer system on which the present invention resides.
Figure 5:
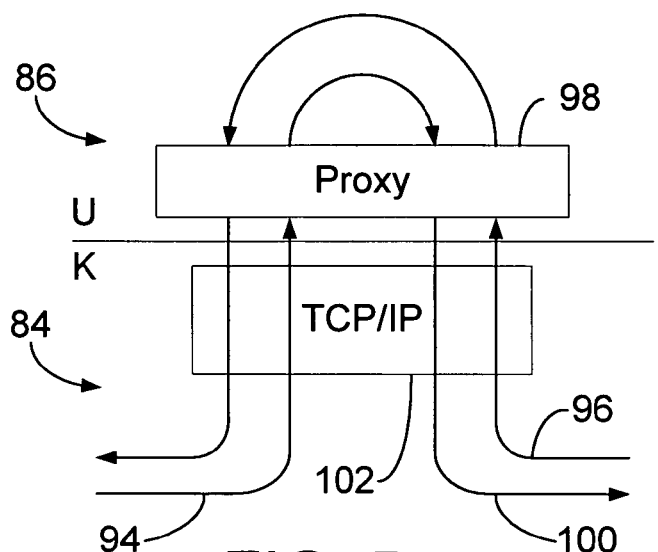
FIG. 5 is an architectural diagram illustrating a traditional proxy.
Figure 6:
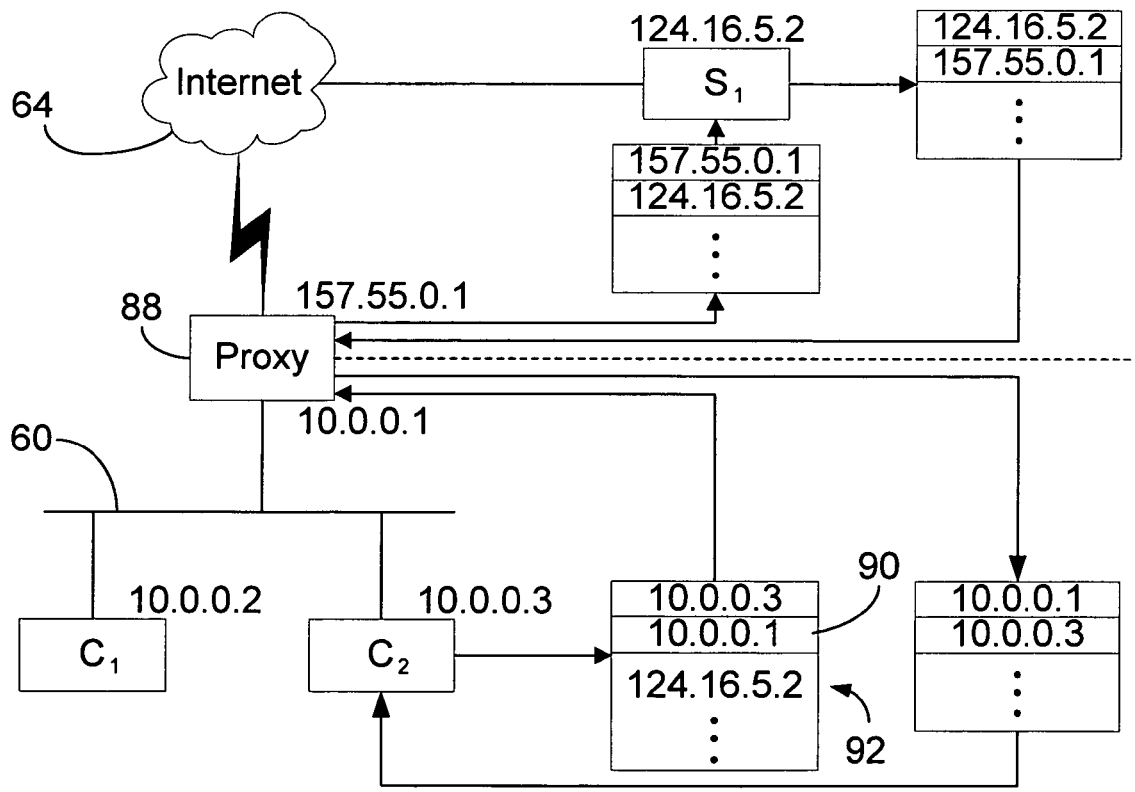
FIG. 6 is a network block diagram illustrating architectural and communicative aspects of a traditional proxy.
Figure 7:
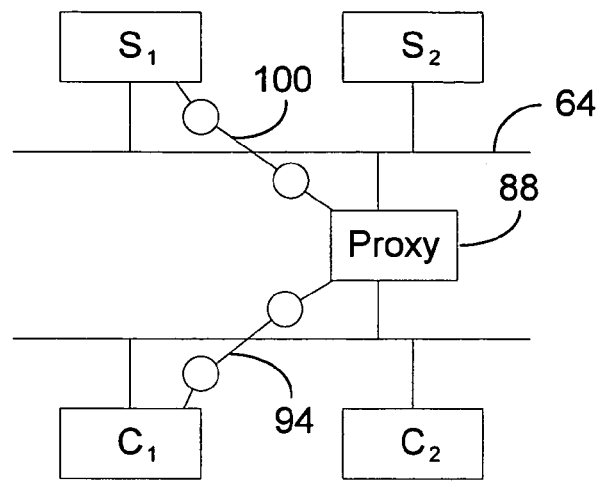
FIG. 7 is an operational block diagram of a traditional proxy.
Figure 8:
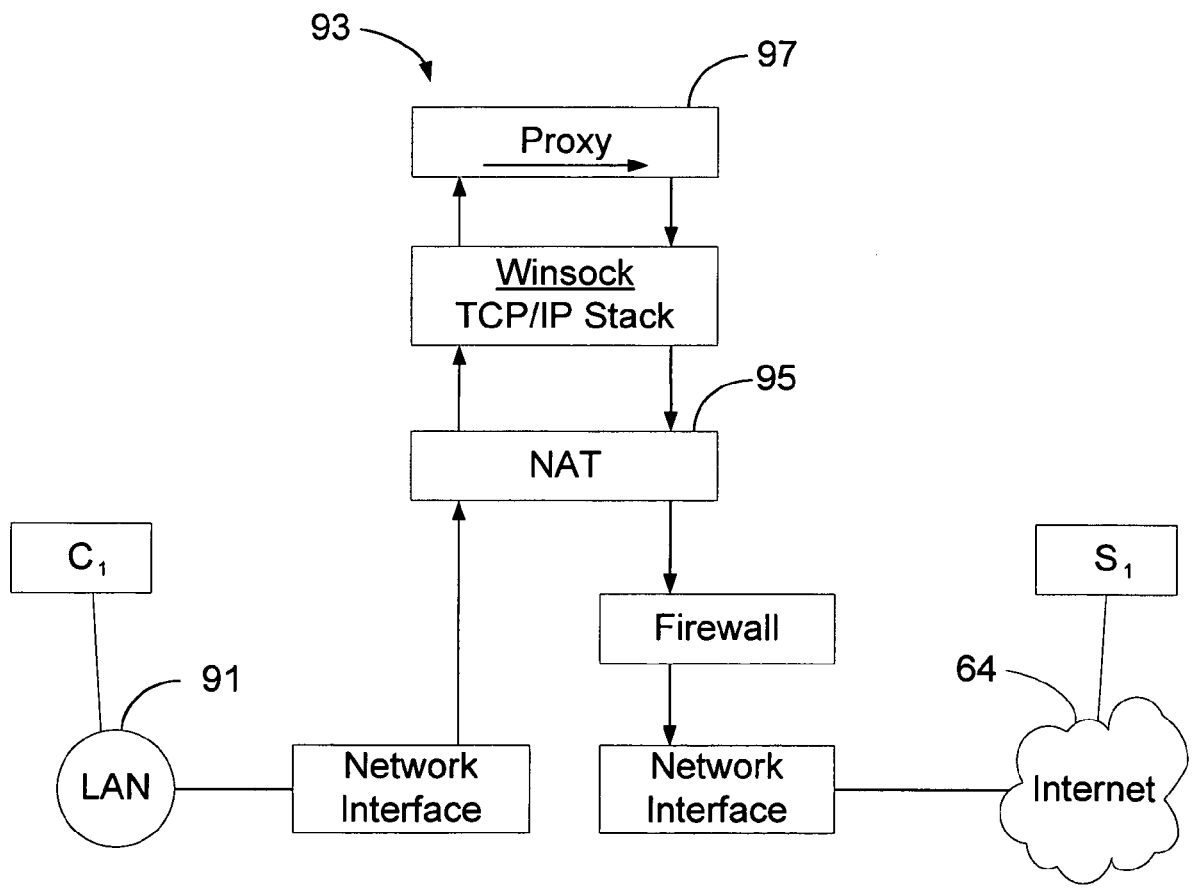
FIG. 8 is an architectural diagram illustrating a traditional transparent proxy.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the person computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 9:
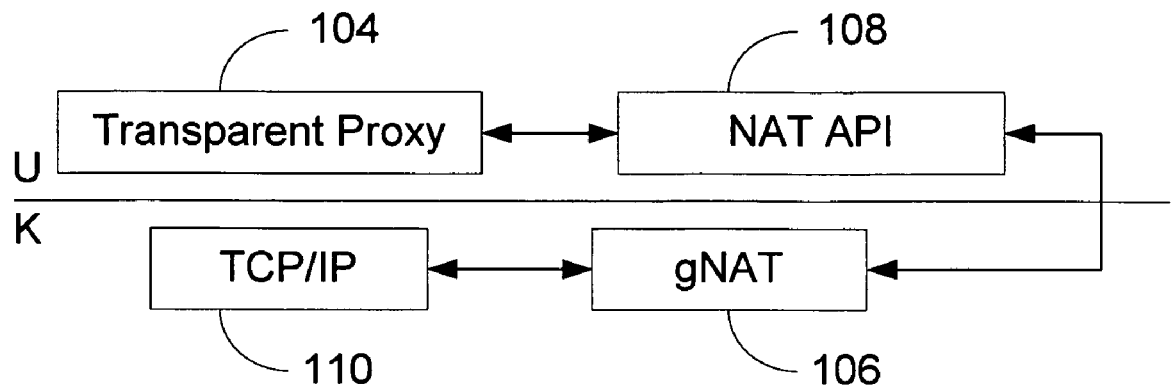
FIG. 9 is an architectural diagram illustrating the generalized network address translator and its associated application programming interface of the instant invention.

In accordance with the invention, generalized network address translation functionality that allows the development of the intelligent transparent proxy is provided to the transparent proxy application 104 by the architecture illustrated in FIG. 9. This functionality includes kernel-mode support for proxy-controlled network address translation through the generalized network address translator (gNAT) 106, and user-mode implementation of these redirect application programming interface (API) 108 routines. In this way, the system of the instant invention allows a transparent proxy application 104 to request that a network gateway modify the source and/or destination address of a given network session in a manner transparent to the original source host and/or the replacement destination host. This ability made available by the instant invention allows true intelligent proxy-controlled arbitrary redirection on network sessions. While the application process 104 is illustrated in the user-mode, it should be recognized by those skilled in the art that the invention is not so limited to only user-mode applications. Indeed, a network application 104 using the services of the gNAT 106 may reside in kernel-mode. In such a situation, the API 108 would also exist in the kernel-mode, and such a situation is within the scope of the instant invention. Further, it should be recognized that the proxy application and the gNAT gateway may be physically located on different computers, and that such implementation is also within the scope of the instant invention.

By generalizing the operation of network address translation and putting that operation under proxy 104 control, the system of the instant invention allows the proxy 104 to achieve a number of benefits. This functionality may be used to redirect sessions to support migration of services for enhanced availability. This functionality is unique to the system of the instant invention in that the application programming interface 108 allows proxy applications 104 to gain explicit control over the translation performed by the gNAT 106, unlike traditional transparent proxies which do not have any control over the NAT to command dynamic address redirection.

Further, since the traditional transparent proxy transfers information between separate network sessions, it typically suffers performance degradation. As discussed, this is because the network data must be received from the network for one of the proxy's sessions, delivered to the user-mode proxy by the kernel-mode network transport, read by the proxy, written to the proxy's other session, transferred to the kernel-mode driver, and transmitted to the network for the proxy's other session. Instead of taking the above steps to copy data from one network session to another, the application programming interface 108 allows such proxies 104 to instruct the network gateway or generalized NAT (gNAT) 106 to translate one network session into another.

As may be seen from the architectural diagram of FIG. 9, the system of the instant invention comprises a kernel-mode translation module 106 that processes packets received from the network and modifies those packets in real-time in accordance with dynamic redirect instructions from the transparent proxy 104. The system further includes a user-mode application programming module 108 that implements the interface invoked by transparent proxy 104. As will become apparent from the following description, the application programming module 108 consists of two API suites that together enable the development of the intelligent transparent proxy of the instant invention.

The first of the two API suites provides the dynamic redirect API routines. These routines allow an application process to redirect to itself all sessions for a certain TCP or UDP port number (e.g., redirecting all HTTP sessions to a local socket). These API routines cause the requests from clients to be translated in such a way that they are delivered by the network gateway to the application process, rather than being forwarded through the normal mechanism to the client's intended server.

The second of the two API suites provides the port-reservation API routines. These routines allow an application process to reserve for itself blocks of TCP or UDP port numbers. In the process of acting as a transparent proxy, the proxy may find it necessary to intervene in the establishment of additional network sessions between a client and a server. In order to do so, the process of the instant invention may need to replace port numbers advertised by clients with port numbers valid on the proxy process's host machine. To address this requirement, routines are provided to allow the transparent proxy to reserve TCP and UDP port numbers for its own use, with the assurance that the reserved numbers will not be allocated for use by any other applications.

The kernel-mode translation module 106 performs the functions of a generalized network address translator (gNAT). This module 106 is implemented in a preferred embodiment as a Windows 2000 driver that registers itself as a firewall driver with the Windows 2000 TCP/IP driver 110. Of course, one skilled in the art will readily appreciate that this module may also be adapted to operate in other operating systems without undue experimentation and without departing from the scope and spirit of the instant invention. Therefore, these alternate embodiments are hereby reserved. In its registration, the module 106 supplies an entry-point that is called by the TCP/IP driver 110 upon reception of every incoming packet and before transmission of every outgoing packet. This ensures that all packets will be observed by the kernel-mode translation module 106 before being sent, received, or forwarded.

Each proxy-requested translation is recorded by the kernel-mode translation module 106 as a redirect. Such a redirect consists of a description of the session to be translated, along with a description of the translation to be performed. For example, the description of the translation may state that when a session is detected with source address S and destination address D, translate it so that the source address becomes S' and the destination address becomes D'. When the module 106 detects any new network session, it determines whether there is a redirect that applies to the session. If the module 106 determines that there is a redirect for this session, the redirect is activated. The network session is automatically translated and a mapping is created to ensure that the same translation is done for all packets in the session. The normal processing is then continued on the session's translated packets, causing them to be delivered locally or forwarded depending on the new source and destination.

The user-mode application programming module 108 is also preferably implemented as a Windows 2000 library that is loaded by the transparent proxy application 104. As with the above, the invention is not so limited to a particular operating system, but is applicable to any operating system which allows network communication. Therefore, the exemplary embodiments described herein are by way of illustration and not by way of limitation. A proxy application 104 calls the library 108 to initialize the kernel-mode translation module 106, and then creates one or more redirects for the network sessions to be translated. To allow the proxy 104 to add value and observe the requested sessions, the initial redirects commanded by the proxy 104 provide redirection of all message packets up to the proxy 104.

Using the API routines provided by the NAT API 108, a process might act as a transparent proxy for HTTP sessions, for example, by starting up, binding to a local socket, and initializing the transparent proxy API library on the network gateway machine. The transparent proxy 104 then retrieves the address of its local socket and invokes the transparent proxy API 108 to create a 'dynamic port-redirect' for TCP port number 80 (which is the HTTP port) using its local socket's address. While this exemplary operation is described for an HTTP port, one skilled in the art will recognize that the dynamic port-redirect may be accomplished for any port number.

The port-redirect command tells the API library 108 to instruct the network gateway that all sessions destined for TCP port number 80 must be directed instead to the transparent proxy's socket. As a client starts an Internet browser, it sends a connection-request to TCP port number 80 of a server on the Internet through the network gateway. The network gateway determines that the client's connection-request matches the transparent proxy's commanded redirect, and it triggers the kernel-mode network address translation module 106.

The kernel-mode translation module 106 changes the destination address of the client's connection-request to be the local address of the transparent proxy's socket, records the change made in a translation mapping, and returns the connection request to the network gateway. The network gateway forwards the client's connection-request, which is now destined for the transparent proxy instead of the Internet server to which the request was originally sent. The transparent proxy 104 receives the client's connection-request and invokes the transparent proxy API 108 to determine the address of the Internet server to which the request was originally sent. The transparent proxy 104 performs processing on the client's request, including optionally initiating a secondary connection on the client's behalf to the original target Internet server or to another server or servers. The transparent proxy 104 then sends responses to the client, which pass through the network gateway and are translated by the kernel-mode translation module 106 so that the client continues to believe that it is communicating with its original target Internet server.

In a preferred embodiment, the library 108 provides routines to perform at least the initializing and shutting down of the library. The initialization ensures that the kernel-mode translation module 106 is loaded and registered in preparation for translating network sessions. The shutting down of the library concludes the proxy's use of the kernel-mode translation module, which may be unloaded if it has no other clients. Further, the library 108 also includes routines for creating a redirect for a network service. This operation supplies information identifying a network service, along with information describing the translation to be done for all clients of the network service. Its protocol, its destination port, its replacement destination IP address, and its replacement destination port identify a network service. The protocol indicates the transport-layer protocol of the network session, which may be either TCP or UDP. The destination port indicates the port number of the network service, e.g. port 80 for the HTTP service. Any client attempting to connect to this port on any Internet server is then redirected to the host given as part of this dynamic redirect.

The replacement destination IP address indicates the IP address of the host to which any matching session should be redirected. The replacement destination port indicates the port number to which any matching session should be redirected on the given host. By replacing the port number rather than retaining the service's original port number, a transparent proxy can be more flexible about which port number can be used for the socket on which it accepts clients's requests. The library also provides retrieving of the original destination for a redirected network session. This operation supplies the original source and destination for a network session which has been redirected by the network gateway, given the post-redirection source and destination for the session. This information is retrieved by the network gateway from the translation mapping maintained by the kernel-mode translation module 106 for each translated session. Finally, the library provides routines to cancel a redirect for a network session. This operation revokes a previous translation-request issued by the proxy 104.

The port-reservation API is implemented as part of the Windows 2000 library 108 that contains the dynamic redirect API routines. The transparent proxy 104 calls the library upon initialization, and then creates one or more port pools that contain port numbers reserved from the network gateway's range of TCP and UDP port numbers. The proxy can then reserve and release port numbers from the created pools. The routines provided by the library include creating and destroying a port reservation, and acquiring and releasing a port number. The creation of a port reservation prepares the network gateway to receive requests for port numbers from the library, and returns a handle to the network application that can be used for requesting port numbers. The destroying of a port reservation destroys a handle supplied by the previous operation, returning all outstanding port numbers to the network gateway. The acquiring of a port number from a reservation requests one or more contiguous port numbers from the network gateway. Finally, the releasing of a port number to a reservation returns one or more previously acquired contiguous port numbers to the network gateway.

Figure 10:
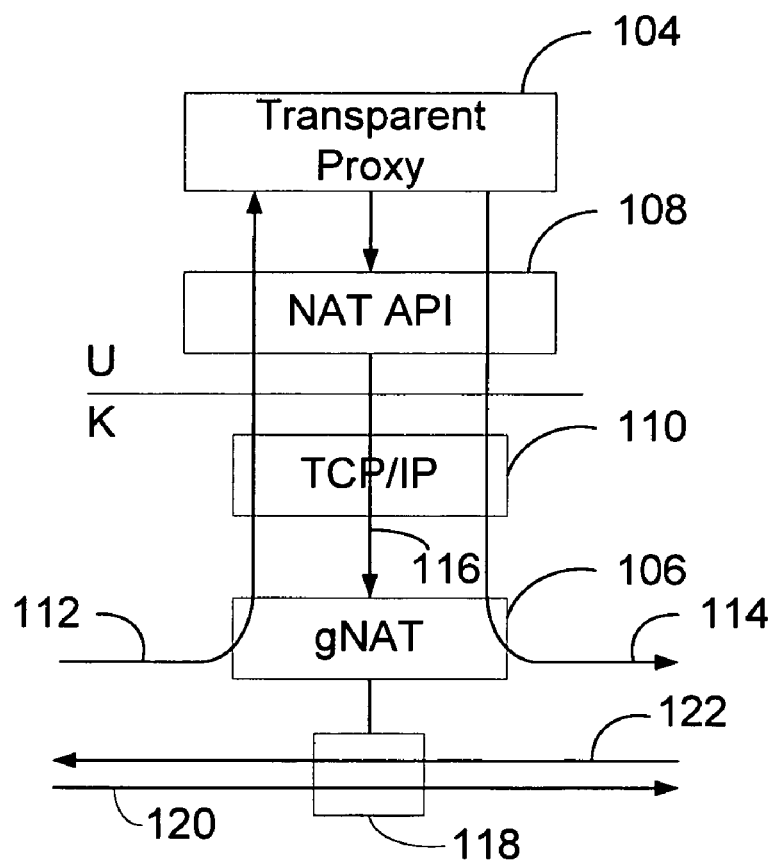
FIG. 10 is a functional architectural diagram of the instant invention.

The operation of translating network sessions at the transport-layer is illustrated in FIG. 10 to which specific reference is now made. Upon establishment of a network session by the receipt of network data on session line 112, the data is communicated to the proxy 104. Upon processing by the proxy 104, this initial data is copied to a second session 114, and transmitted to the network by the driver 110. This initial operation is much like a traditional proxy, except that the gNAT 106 may transparently redirect the data to the proxy 104 even if the client process is not aware of the network application, much like a traditional transparent proxy. Unlike a traditional or transparent proxy, the transparent proxy 104 of the instant invention is now able to utilize the API 108 to command (illustrated by line 116) a dynamic redirect so that further data transitions from kernel-mode to user-mode are no longer required. This establishes a fast-path for proxy-like applications in which datagrams must be copied from one session to another. This fast-path transfer is ideal for data streaming applications, on-line gaming, multi-party conferencing, etc.

Once the proxy 104 has determined that a dynamic redirect is appropriate and such has been commanded of the gNAT 106, it establishes a dynamic redirect mapping 118. All network data that is received from the network for the proper proxy's session (as determined by the gNAT 106 in accordance with its commanded dynamic redirect 118) is automatically translated by the gNAT 106 so that its transport-layer address matches the proxy's other session. This data is then transmitted to the network for the proxy's other session. Graphically, this dynamic redirection at the transport layer is illustrated by line 120. As may be seen from line 120, the communication of the data to the network server no longer requires that the data go through two kernel-user mode translations, i.e. the trip to the proxy 104 is short circuited. Likewise, return data on line 122 may also be dynamically redirected to the client if so commanded by the proxy 104. The approach allows such applications to achieve a considerable improvement in their performance.

This performance improvement becomes vividly apparent if the initial communication on line 112 opens an ftp control session carrying an ftp get file request. Under a traditional transparent proxy scenario, the ftp data channel created to receive the file requested would first be passed from the kernel-mode to the user-mode to the proxy, and then would be passed back down to the kernel-mode to be forwarded to the client. As may well be imagined, this process incurs significant performance degradation, especially if the file is quite large. Under the system of the instant invention, however, the network application 104 may open a data session that does not require any transitions to the user-mode by commanding a dynamic redirection at the transport-layer. Now, as the data is received from the ftp server, the gNAT 106 performs the dynamic redirection in accordance with the intelligent transparent proxy's command. The destination address of the data is simply translated and passed to the client as indicated by line 122. Significant performance improvement is achieved in this way.

The system of the instant invention also allows session payload editing. Certain applications include addressing information within the data streams of their sessions. For instance, many streaming applications use a control session to establish a secondary data session similar to that described above. This poses a problem for a traditional NAT in its primary application, i.e. transparent sharing of a single Internet connection among multiple machines. When running on clients that are sharing a connection, such applications would send private, unreachable addressing information to remote peers, and the latter would be unable to respond to the clients's requests. To solve this problem, the system of the instant invention supports an extensible means of modifying a session's application-layer data in flight, beyond the modifications made to the session's network-layer and transport-layer addressing information. Extensibility is achieved by allowing third-party drivers to inspect the application-layer data in each packet received for a session, and to edit the application data in each packet. These editors register themselves with the gNAT of the instant invention as handlers for a specific TCP/UDP port number, and are henceforth invoked for each message translated in matching sessions.

Figure 11:
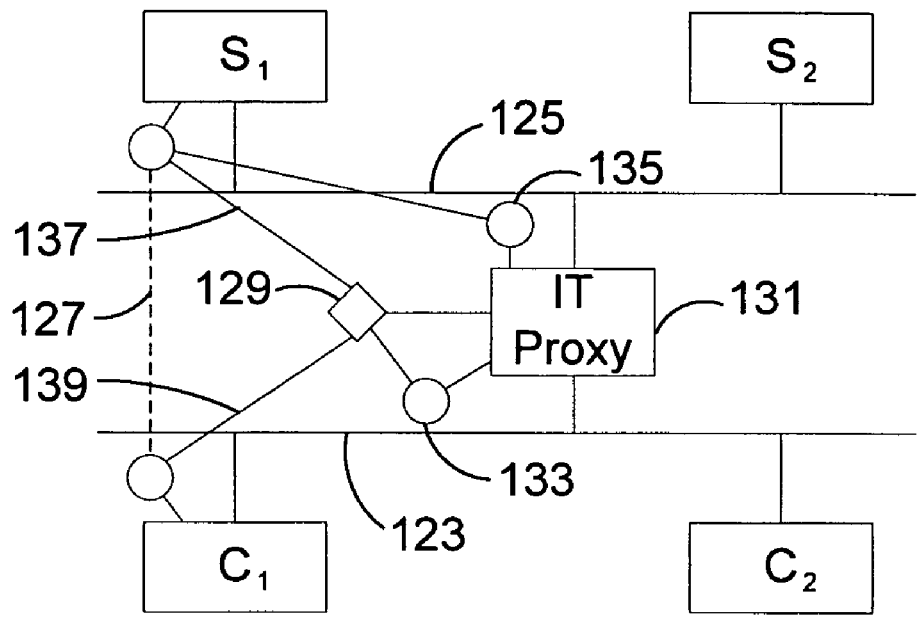
FIG. 11 is an operational block diagram illustrating an aspect of the instant invention.

In operational terms, the dynamic redirection made available by the system of the instant invention is illustrated in FIG. 11. As illustrated therein, a client process $C_1$ on a private network 123 sends a message packet destined to server $S_1$ on a public network 125. The apparent path of the message packet is as illustrated by dashed line 127. However, when the message packet hits the dynamic redirect 129 of the gateway machine 131 running the intelligent transparent proxy application, the message packet is redirected to a proxy session 133. The intelligent transparent proxy of the instant invention then services this message packet by, in this case, forwarding it to a second session 135 for transport to the server $S_1$. The proxy could have denied the message packet, forwarded it to a local server (not shown) for servicing, serviced the message itself, etc.

Typical transparent proxies also service the responsive communication from the server $S_1$ as a matter of course. While this is also possible with the intelligent transparent proxy of the instant invention, it may decide to open a fast-path data transfer session and forego transitions to and from the user-mode in the gateway machine. The proxy accomplishes this by commanding a dynamic redirect to be mapped in the gNAT. When the server $S_1$ responds (illustrated by line 137), the message packet is seen by the gNAT, which verifies that it has a proxy commanded redirect for that message, and is redirected at the transport-layer to the client $C_1$ as indicated by line 139. This transmit-proxy, receive-NAT functional operation significantly improves the performance of the system, especially in situations of data streaming, multi-party conferencing, multi-party gaming, etc.

Figure 12:
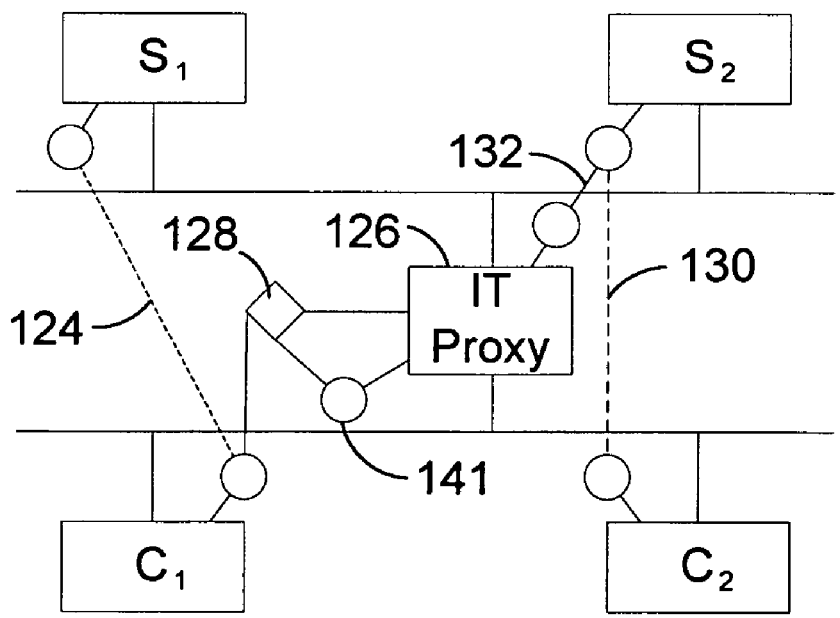
FIG. 12 is an operational block diagram illustrating an alternate aspect of the instant invention.

A further dynamic redirection that may be commanded by the intelligent transparent proxy of the instant invention is illustrated in FIG. 12. A client $C_1$ may wish to establish a session with server $S_1$ by addressing messages thereto. This is the apparent session from the client $C_1$'s point of view, as illustrated by the dashed line 124. However, when the gNAT machine 126 detects the message from C1 addressed to S1, it checks to determine if a dynamic redirect exists for such a session as discussed above. As illustrated in FIG. 12, a dynamic redirect 128 does exist to forward the message to the proxy session 141. The proxy may include a translation of both the source and destination addresses such that the messages are actually forwarded by the proxy to server $S_2$ with an indication that the source was $C_2$. From the server $S_2$'s point of view, an apparent session 130 has been established between $S_2$ and $C_2$. The actual session 132 that has been established is between $C_1$ and $S_2$, although neither $C_1$ nor $S_2$ knows that this is the case. Each of the required translations is accomplished transparently.

As described above, the intelligent transparent proxy may use the NAT API 108 (see FIG. 9) to command a dynamic redirect in the gNAT 106 so that when messages are received from server $S_2$ they may be properly routed to the correct client ($C_1$). This dynamic redirection may be commanded to take place at the transport-layer (kernel-mode) to speed performance, or may require that the messages be forwarded up to the proxy for processing prior to being delivered to the client. Indeed, the proxy may decide not to forward the message at all (e.g. based on site blocking or parental control programming within the proxy). Since the gNAT allows dynamic address translation of both source and destination IP addresses, the proxy can command various translations that may be made at the transport-layer, establishing any number of apparent sessions as desired. Placing this dynamic redirection ability under the explicit control of the proxy provides significant advantages, not the least of which is performance improvement. Indeed, this system allows the benefits of both proxies and NATs to be achieved at each data session. Further, these advantages may be maximized under proxy control for each session, i.e. for the transmission, reception, and redirection of message flow as well as for control versus data sessions.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method of session payload editing by an intelligent transparent application gateway between a private and a public network, the private network serving at least one client and the public network including at least one server, comprising the steps of:

binding a session payload editor application to a local socket;

commanding, by the session payload editor application, a dynamic port-redirect from a destination port number to the local socket;

receiving from a client a request to connect to the destination port number, the request including application-layer data;

redirecting the request to the local socket;

editing the application-layer data of the request by the session payload editor application; and forwarding the request to the server.

2. The method of claim 1, wherein the step of commanding a dynamic port-redirect comprises the steps of:

invoking a transparent proxy application programming interface (API) to create the dynamic port-redirect; and instructing a generalized network address translation module (gNAT), by the API, to perform the dynamic port-redirect at a kernel-mode.

3. The method of claim 2, wherein the step of redirecting the request to the local socket comprises the steps of:
changing, by the gNAT, a destination address of the connection request to a local address of the local socket;
recording the change made in a translation mapping; and
forwarding the connection request to the session payload editor application.

4. The method of claim 3, wherein the step of forwarding the request to the server comprises the steps of;
invoking the API to determine the address of the server to which the request was originally sent;
establishing a session on the client's behalf with the server; and
sending the request to the server.

5. The method of claim 1, wherein the step of editing the application-layer data of the request by the session payload editor application comprises the steps of:
inspecting the application-layer data of the request;
determining that the application-layer data contains private, unreachable addressing information; and
modifying the private, unreachable addressing information to addressing information of the intelligent transparent application gateway.

6. The method of claim 5, further comprising the step performed by the session payload editor of establishing a data session for responses from the server.

7. The method of claim 6, wherein the step of establishing a data session for responses from the server comprises the steps of:
commanding a dynamic address translation for message packets received from the server to the client;
receiving a message packet from the server at the kernel-mode gNAT;
translating a destination address of the message packet to the client in the kernel-mode gNAT; and
forwarding the message packet directly to the client, thereby bypassing the session payload editor application.

8. A method of session payload editing of application-layer data of message packets communicated between a client and a server through a gateway, comprising the steps of:
commanding a dynamic port-redirect within the gateway from a first port to a second port, the second port being bound to a session payload editing application;
receiving a message packet having application-layer data contained therein directed to the first port;
performing a kernel-mode dynamic address translation in accordance with the commanded dynamic port-redirect to direct the message packet to the session payload editing application;
editing the application-layer data of the message packet; and
forwarding the message packet with the edited application-layer data to the server.

9. The method of claim 8, wherein the step of receiving a message packet having application-layer data contained therein comprises the step of receiving a message packet having application-layer data including private address information of the client, and wherein the step of editing the application-layer data comprises the step of replacing the private address information with public address information of the gateway.

10. The method of claim 9, further comprising the steps of:
commanding a dynamic address translation for message packets received from the server with the public address information;
receiving a message packet from the server at the kernel-mode gNAT having the public address information;
translating a destination address of the message packet in the kernel-mode gNAT in accordance with the dynamic address translation; and
forwarding the message packet directly to the client, thereby bypassing the session payload editor application.

11. The method of claim 8 further comprising the steps of:
establishing a session with the server to which the message packet was originally sent;
commanding a dynamic address redirect associated with the server at a kernel-level within the gateway; and
dynamically redirecting messages at the kernel-level in accordance with the commanded dynamic address redirect, thereby bypassing the session payload editor application.

12. The method of claim 8 wherein the application-layer data of the message packet includes therein advertised port numbers, further comprising the step of replacing the advertised port numbers within the application-layer data of the message packet with reserved port number of the gateway.

13. A method of performing session payload editing of application-layer data within message packets sent between a client on a private network and a server via an intelligent transparent gateway, comprising the steps of:
registering a session payload editor with a kernel-mode generalized network address translator (gNAT) of the gateway for at least one port number to enable the gNAT to create a dynamic address redirect of message packets directed to the at least one port number to the session payload editor;
receiving a message packet dynamically redirected by the gNAT to the session payload editor; and
inspecting the application-layer data of the message packet.

14. The method of claim 13, further comprising the step of forwarding the message packet with the edited application-layer data to the server.

15. The method of claim 13, wherein the application-layer data includes private addressing information, and wherein the step of inspecting the application-layer data of the message packet comprises the step of editing the private addressing information to provide public addressing information of the gateway.

16. The method of claim 15, further comprising the step of commanding the gNAT to generate a dynamic redirect of messages sent from the server to the public addressing information within the kernel-mode thereby bypassing the session payload editor.

17. The method of claim 13, wherein the step of registering a session payload editor with a kernel-mode generalized network address translator (gNAT) of the gateway for at least one port number to enable the gNAT to create a dynamic address redirect of message packets directed to the at least one port number to the session payload editor comprises the step of registering a session payload editor with a kernel-mode generalized network address translator (gNAT) of the gateway for at least one TCP port number to enable the gNAT to create a dynamic address redirect of message packets directed to the at least one TCP port number to the session payload editor.

18. The method of claim 13, wherein the step of registering a session payload editor with a kernel-mode generalized network address translator (gNAT) of the gateway for at least one port number to enable the gNAT to create a dynamic address redirect of message packets directed to the at least one port number to the session payload editor comprises the step of registering a session payload editor with a kernel-mode generalized network address translator (gNAT) of the gateway for at least one UDP port number to enable the gNAT to create a dynamic address redirect of message packets directed to the at least one UDP port number to the session payload editor.

* * * * *